(12) United States Patent
Lieberman et al.

(10) Patent No.: US 7,568,230 B2
(45) Date of Patent: Jul. 28, 2009

(54) SYSTEM FOR SELECTIVE DISABLEMENT AND LOCKING OUT OF COMPUTER SYSTEM OBJECTS

(75) Inventors: Philip Lieberman, Beverly Hills, CA (US); Nicholas M. Carroll, Los Angeles, CA (US)

(73) Assignee: Lieberman Software Corporation, Los Angeles, CA (US)

( * ) Notice: Subject to any disclaimer, the term of this patent is extended or adjusted under 35 U.S.C. 154(b) by 1142 days.

(21) Appl. No.: 10/709,965

(22) Filed: Jun. 9, 2004

(65) Prior Publication Data

US 2005/0278785 A1    Dec. 15, 2005

(51) Int. Cl.
*G06F 11/00* (2006.01)
(52) U.S. Cl. .............................. 726/23; 726/22; 726/24
(58) Field of Classification Search ..................... 726/2, 726/3, 16, 22, 23, 24
See application file for complete search history.

(56) References Cited

OTHER PUBLICATIONS

Cratering_Survive_and_Prevent_Virus_Outbreaks.pdf, year 2006.*
Policy-Based Access Control Framework for Large Networks, Weber-MIT.pdf, year 2002.*
Massive_Security_Hole_Ignored.pdf, year 2007.*
Access control and session management in the HTTP environment Gutzmann, K.; Internet Computing, IEEE vol. 5, Issue 1, Jan.-Feb. 2001 pp. 26-35.*
Role-based access control for grid database services using the community authorization service A.L. Pereira; V. Muppavarapu; S.M. Chung; Dependable and Secure Computing, IEEE Transactions on vol. 3, Issue 2, Apr.-Jun. 2006 pp. 156-166.*
Sender Access Control in IP Multicast Islam, Salekul; Atwood, J. William; Local Computer Networks, 2007. LCN 2007. 32nd IEEE Conference on Oct. 15-18, 2007 pp. 79-86.*

* cited by examiner

*Primary Examiner*—David Y Jung
(74) *Attorney, Agent, or Firm*—Raymond E. Roberts; Patent Venture Group (57) ABSTRACT

A method for disabling a process in a computer, particularly including processes such as viruses, spyware, adware, and malware generally. A file object (file or folder) is identified in the computer that is required by the process. An access control entry (ACE) is then stored in an access control list (ACL) for the file object. The ACE specifies an entity (user or group) and a permission needed by that entity to access or execute the file object. The ACE further specifies that the entity is denied the permission it needs. This disables the process by denying the entity the future ability to access or execute the file object.

50 Claims, 3 Drawing Sheets

SYSTEM FOR SELECTIVE DISABLEMENT AND LOCKING OUT OF COMPUTER SYSTEM OBJECTS

BACKGROUND ART

The complete set of processes that run in a modern computer is considerable and growing at an astounding rate. Of present interest is operating system (OS) software and the application software that runs "above it". A modern OS is extremely complex. For discussion we can use the family of Windows™ operating systems offered by Microsoft Corporation of Redmond, Wash. as an example. This family currently includes Windows XP, offered in Home, Professional, Media, Tablet, and CE (personal digital assistant (PDA)) editions. This family also includes Windows Server 2003, also offered in multiple editions. While the number of OSs and their variations is mentally manageable, the variety of applications software today is simply staggering.

Unfortunately, despite all of the power and speed that our modern computers provide, in fact, largely because of these, there are still processes that can inappropriately be run in computers. That is, processes that can be run that are malicious, dangerous, or simply undesirable. The most common example of malicious software is viruses, but spyware and adware are rapidly growing concerns, and malicious software now takes on so many forms that it is been generically termed "malware". In general, viruses are software that computer users do not want in the first place, and then want to be quickly rid of if one is present. In contrast, dangerous software has desirable and valid uses, when employed by skilled and well intended people. Even computer users with limited skill usually appreciate that storage media formatting and file attribute changing utility software is dangerous. Finally, there is software that is simply inappropriate because an authority has deemed it to be. For instance, an individual at home may play computer games that are part of their computer's operating system's default installation package. This hypothetical individual may also download music, with or without regard for the copyrights applying to it. At work, however, this hypothetical individual's employer probably objects to the playing of computer games and wants to closely control the downloading and playing of music.

Of course, some tools to handle malicious software already exist. For instance, anti-virus software for computers is a thriving business today. But the reasons for that include limitations in that software and the number and speed with which ways to avoid such software are developed. The same is true for other forms of malware.

Dangerous and undesirable software presents a slightly different situation. For example, the hypothetical employer introduced above could simply take the extra effort to selectively disable or remove games, multimedia retrieval/playback applications, etc. But this may not be practical enterprise-wide, say, including a marketing department where multimedia software is a valid tool. It also is not practical for utility programs that may later be needed. Nonetheless, labor intensive tailoring of individual computer systems, compromises, or simply ignoring the problem are still the usual approaches to dealing with dangerous and undesirable software.

Accordingly, techniques and tools are still needed to control the running of processes that are malicious, dangerous, and undesirable. In particular, such techniques and tools should preferably work all of these, without any special regard to the underlying nature of software. These techniques and tools should preferably also be usable if processes from such software are already running, to stop these processes and prevent them from running in the future. And these techniques and tools should preferably further be able to controllably prevent the introduction of malicious, dangerous, or undesirable software into computers in the first place.

DISCLOSURE OF INVENTION

Accordingly, it is an object of the present invention to provide a system for selectively disabling and locking out computer system objects, including (but not limited to) computer files, directories, registry keys, active directory objects, etc.

Briefly, one preferred embodiment of the present invention is a method for disabling a virus in a computer. A system object is identified in the computer that is required by the virus. An access control entry (ACE) is then stored in an access control list (ACL) for the system object. The ACE specifies an entity (a user or group) and a permission that is needed by the entity to access or execute the system object. The ACE further specifies that the entity is denied the permission, thus disabling the virus by denying the entity future ability to access or execute the system object.

Briefly, another preferred embodiment of the present invention is a method for disabling a process in a computer. A system object is identified in the computer that is required by the process. An access control entry (ACE) is then stored in an access control list (ACL) for the system object, wherein said ACE specifies an entity and a permission needed by the entity to access or execute the system object. The ACE further specifies that the entity is denied the permission, thus disabling the process by denying the entity future ability to access or execute said object.

Briefly, yet other preferred embodiments of the invention are products made by the methods of the preferred embodiments just described.

An advantage of the present invention is its near universal applicability. While the most widely used operating systems (OSs) today are variations of Windows™, and the invention works well on all current and expected versions of this OS family, the invention may also be implemented in virtually all OSs that implement an access control mechanism that permits denying access to file or other system objects even when the requester is an administrator or the OS itself.

Another advantage of the invention is the flexibility with which it may be used. It can disable undesired processes that are already present and running, as well as inoculate against undesired processes being newly introduced and run in the future.

Another advantage of the invention is the flexibility with which it may be implemented. Existing operating system and third-party utilities can be used to manually perform processes in accord with the invention. This can also be carried out over networks on remote computer systems, albeit simply in more powerful "manual" forms. Alternately, the invention can be implemented in sophisticated full-featured embodiments that automate the tasks involved and that can be run remotely over networks on large numbers of computer systems concurrently. [The latter is notably seen in the inventor's commercially available implementation, User Manager Pro™ from Lieberman Software Corporation of Beverly Hills, Calif.]

Another advantage of the invention is the efficiency that it may provide in use. Undesired processes can be disabled in a very short time, despite very aggressive efforts by such processes to prevent this, and despite sever disruption of the underlying computer system, ether by the undesired process, collaterally due to its presence, or simply coincidentally occurring.

Another advantage of the invention is the efficiency it may provide over time, since it effectively requires no ongoing expenditure of resources. The invention applies a one-time inoculation, rather than serving as a continual prophylaxis or a server medicant, thus being particularly distinguished from the limited two-pronged traditional approach to handling malware. The first traditional prong is to continuously devote a small percentage of computer clock cycles to monitoring for malware being introduced, in the hope of stopping that, and the second prong being to periodically devote a large percentage of computer clock cycles to scanning for malware that the first prong has missed. As is well known, the vigilance of the first prong frequently fails, the "cure" of the second prong is "worse than the disease" or comes too late to save the "patient". Once malware has had the run of a system, "strong medicine" is needed to remove the file objects, registry changes, collateral damages, etc, attributable to the malware. Also, the re-infection rate when traditional approaches are used is often high. The present invention does not suffer from these limitations.

Another advantage of the invention is that it may be very robust. Disabling or circumventing the invention are not trivial operations. The level of skill required to do either of these is considerable, and the amount of effort then required to carry out such is appreciable.

And another advantage of the invention is that it can work in concert with other desirable aspects of malware handling and elimination. For example, without limitation, the invention can work with registry scans to identify problems and to determine particular malware file objects or other malware system objects that are suitable targets of opportunity to eliminate such problems. The invention can also be used in concert with registry editing and software patching. If desired, the invention and other capabilities, like those noted, can all be collectively implemented in single software packages.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended figures of drawings in which.

In the various figures of the drawings, like references are used to denote like or similar elements or steps.

BEST MODE FOR CARRYING OUT THE INVENTION

A preferred embodiment of the present invention is a system for selective disablement and locking out of computer files and other computer system objects, specifically such that even the operating system cannot access the system objects that have been locked. As illustrated in the various drawings herein, and particularly in the views of FIGS. 2 and 3, preferred embodiments of the invention are depicted by the general reference characters 100, 200.

A large percentage of computer systems today have operating systems that selectively control user access to system objects (for example, files in storage) by use of Access Control Entries (ACEs) in Access Control Lists (ACLs). The Windows™ operating systems by Microsoft Corporation are doubtless the most widely used examples of this. Starting with Windows NT and followed by Windows XP, Windows 2000, and Windows 2003, the New Technology File System (NTFS) has become available in Windows. Other operating systems, such as Linux, are now also employing NTFS or other ACL/ACE-like access systems, and this approach has become the usual choice for formatting computer system disks where operating system folders are stored.

Figure 1:
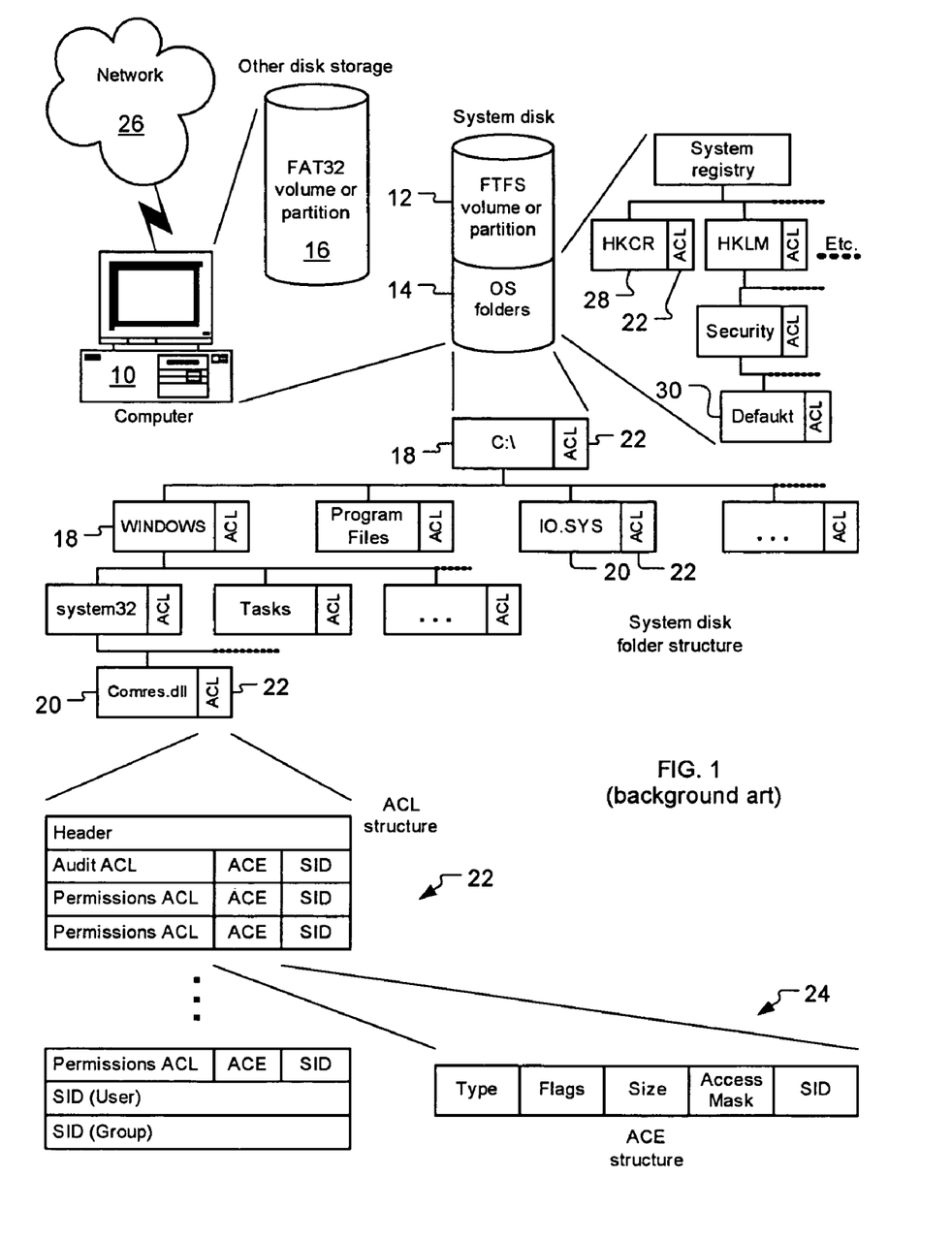
FIG. 1 (background art) is a schematic diagram depicting how access to system objects is controlled by Access Control Entries in Access Control Lists in the widely used New Technology File System scheme.

FIG. 1 (background art) is a schematic diagram depicting how access to file objects is controlled by ACEs in ACLs in the widely used NTFS scheme. This scheme is indicative of how access to any system object is controlled by ACEs in a modern operating system which utilizes ACLs. A computer 10 here has a system disk 12 (an entire physical volume or a logical partition of a physical volume) that is formatted with NTFS and has operating system folders (OS folders 14) stored there. Other storage disks 16 may or may not be present and may or may not be formatted with NTFS.

FIG. 1 further stylistically depicts representative folders 18 and files 20 that are stored on the system disk 12. In a NTFS partition or volume every folder 18 and file 20 has an associated ACL 22 including one or more ACEs 24 that controls access to the respective folder 18 or file 20.

The structures of an ACL 22 and of an ACE 24 are also shown in FIG. 1. Before proceeding, it should be noted that terminology in this field is often used loosely and can somewhat confusingly. For example, practitioners of this art may simply say "ACL" when speaking generally and "ACE" is the more correct term. In the ACL 22 in FIG. 1 there are entries labeled both "Audit ACL" and "Permissions ACL". More correctly, however, these are ACE records within the overall ACL 22. The ACE records labeled "Permissions ACL" are of interest for this discussion, and "Audit ACL" records are not discussed further.

Within an ACE record (ACE 24) a block of ACE data is stored (confusingly labeled "ACL" in many references). This block contains fields that specify what control the ACE 24 provides. A Type field specifies whether access is to be "Allowed" or "Denied"; an "Access Mask" field (also often called "Access Rights") enumerates what actions are being allowed or disallowed; and a Security Identifier (SID) field states whom (what individual user or pre-defined group of users) the ACE 24 is to allow or to deny access to.

Consider the following examples of ACEs 24 in an ACL 22, represented here using a "Type:SID:Mask" format:

---

Allow:Administrators:Full
Allow:JDoe:Full
Deny:Sales:Write
Allow:Everyone:Modify

---

In this example the members of the Administrators group and the individual user JDoe are allowed full control. If this ACL is for a file, they may Read, Write, Execute, or Delete that file. They can also change its permissions and take over its "ownership". Members of the Sales group are allowed to perform the actions that members of the Everyone group can, except that they are denied the ability to perform actions requiring the Write permission. The Modify permission allows modifying and deleting the file, as well as all of the actions permitted by the Read, Write, and Read & Execute permissions. However, the Deny type in the third ACE specifically modifies this with respect to the Sales group. The rules for evaluating access permissions are complex, but generally the narrowest interpretation of multiple ACEs is the one used. Thus, if JDoe is a member of the Sales group, he or she actually has permission for less than the Everyone group.

The discussion and the examples above are necessarily limited, and should not be taken as covering all possible ACL/ACE structures. The nature of such structures and the manner of using them varies considerably in the art. For instance, even within the Microsoft Windows family of operating systems there are some differences between Windows NT 3.51, NT 4.0, 2000, etc.

In the background discussion it was noted that the system objects that need control can often be classified as malicious, dangerous, or undesirable. Briefly recapping, a virus program is the quintessential example of an object that is malicious or that uses dangerous files (or other system objects) in a malicious manner. A disk format utility program is a simple example of a dangerous object, since it can produce catastrophic results when used by an unskilled or malicious person. Undesirable objects often include multimedia playback programs on workplace computers, since these may facilitate employees wasting time or infringing on the media copyrights of others.

In the context of the present invention, the ACL/ACE structure is important because the system objects that most need control in the computer 10 will very likely be stored where such a structure is already provided and permits strong control. From FIG. 1 it can be appreciated that the system disk 12, and particularly the OS folders 14 are usually controlled using an ACL/ACE structure. As is well known in this art, most viruses "live" in operating system folders, and most dangerous and otherwise undesirable program files are installed there, or use file objects that are stored there, as part of default operating system installations.

Of course, the computer 10 can, and today often will, be part of a network 26. Accordingly, everything said above for the computer 10 can apply to tens, thousands, tens of thousands of instances of the computer 10. In modern enterprises, this is now often the situation.

Figure 2:
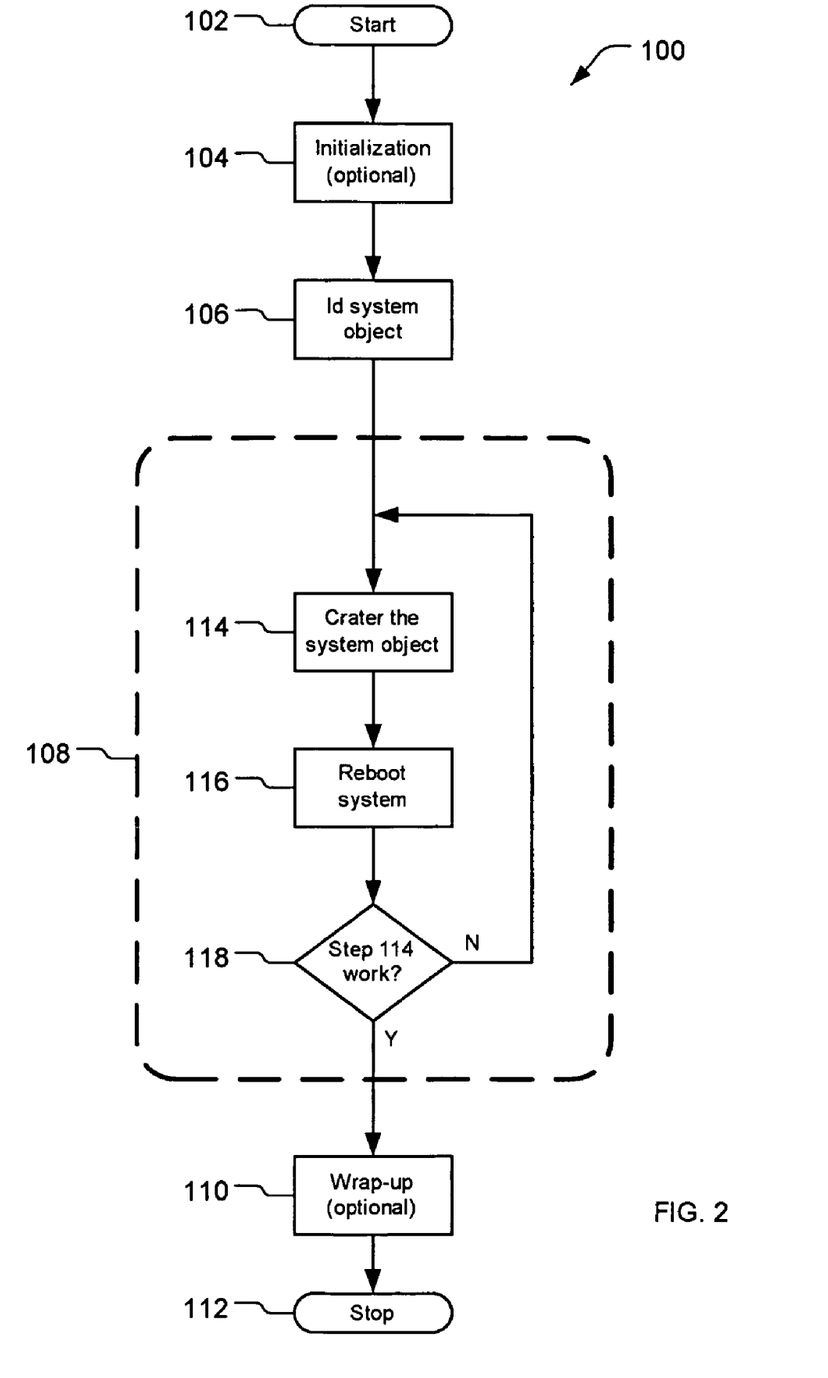
FIG. 2 is a flow chart depicting a method for disabling a virus in the computer of FIG. 1.

FIG. 2 is a flow chart depicting a method 100 for disabling a virus in the computer 10 of FIG. 1. Going through this briefly first, the method 100 starts with a step 102. In an optional step 104, any desired initialization is performed. In a step 106, a file or other system object that the virus requires to execute in the computer 10 is identified. In a sub-process 108, the system object is disabled from executing in the future by changing its ACL. In an optional step 110, any additional desired work related to the virus is performed. And in a step 112 the method 100 stops.

In the optional step 104, desired initialization operations may be performed. This step can include, for instance, determining that a virus is present or merely determining that there is enough evidence to suspect a virus is present in the computer 10.

In step 106, a system object that the virus requires to execute is identified. In general, this "system object" will be a file 20 but it can also be a folder 18, a registry folder 28, a registry key 30, or any other system object which utilizes an ACL. [Note, in this example the system object (a folder 18, file 20, registry folder 28, or registry key 30) that is the system object is already present in the computer 10. This is not a requirement, however, and an example where this is the case is discussed, presently.] If a virus has multiple parts, for example, like the W32.Mydoom.A@mm virus, different parts or all of the parts can be used as system objects for this method 100. Thus, "taskmon.exe" or "shimgapi.dll" or both can be targeted, since these are files that are part of the W32.Mydoom.A@mm virus.

The name of a system object can be determined in many different ways. The names of one or more system objects that are known to be used by or to be part of a virus can be looked for in specific folders 18 or 28 or all of the folders in the computer 10 can be searched. Virus related newsgroups and e-mail circulation groups regularly publish such information.

In its simplest form, the sub-process 108 can include only a step 114, where an ACE is changed or added to the ACL of the file object. This ACE may have a Type field that specifies "Deny" permission; a SID (i.e., a name) field that specifies that the ACE applies to "Everyone"; and an Access Mask/Rights (i.e., a permissions) field that specifies "Full" control over access and rights is to be effected. A value in the SID field other than "Everyone" can be used if it encompasses the actual user or group of users that are to be denied access to the file object, but there is usually no benefit to this and crafting a more specific entry will usually not be worth the bother. Similarly, a value in the Access Mask/Rights field other than "Full" can be used if that encompasses the actual action or actions the file object is to be prevented from performing, but this is also usually outweighed by the bother. If "Deny:Everyone:Full" is used, the net result is that all access by every entity (user or group, process or service, etc.) is locked out, including access by the operating system.

In Windows, the built-in program CACLS.EXE or the Microsoft Resource Kit utility XCALCS can be used to make such ACL changes. There are also free third party ACL management tools available, such as SetACL.EXE. All present Windows-based systems permit the use of "Deny:Everyone: Full" as a unique and identical ACE, and this alone permits a single and very simple coding to be used to cover the variety of workstation and server systems found in many enterprises today. For example, the inventor's company, Lieberman Software Corporation, of Beverly Hills, Calif. provides a User Manager Pro™ tool that provides this as well as many other system management capabilities.

The inventor terms the described manner of disabling a system object as "cratering". The original virus in our example here is disabled because the ACE for a file it needs to run (or a folder it needs to access to run) is set so that the system object cannot be accessed and the virus is left unable to start or operate. As a bonus, unless the virus is very sophisticated about handling ACLs/ACEs (which is not a trivial task), a new infection by the same virus is unable to take hold since the disabled virus system object cannot now be overwritten. In essence, the disabled system object the virus needs gums up the works of re-infection.

In more pragmatic and full-featured implementations, such as User Manager Pro™, the sub-process 108 will usually include some additional steps. Locking out the ACLs for system objects will not stop a virus that is already running. While an unsophisticated virus may be stopped by a skilled computer user with a tool like the Windows Task Manager, few computer users are skilled enough to handle such manual intervention under pressure and many viruses today take measures to prevent being "killed" so easily. Some viruses protect themselves by taking up almost all of the CPU time, effectively "hogging" the machine. Traditional virus handling techniques require appreciable time to execute, which is why cratering is particularly effective in cases where such traditional approaches simply are not fast enough to act before a virus "grabs" the computer back. Cratering can be very, very fast because it requires only one minimal system object access to reset just some permissions. This allows cratering to be performed even in the tiny windows of opportunity which a virus does not control, and thus to be quite effective at combating viruses which are already installed.

It follows that step 114 may not always be successful, or that there may be some concern whether it has been completely successful. A virus may also, intentionally or coincidentally, have the computer 10 continually locking up or rebooting, or be causing other havoc in the computer 10 or on a network which the computer is part of. Thus, sub-process 108 can include a step 116 that kills present execution of the virus and a step 118 that confirms whether step 114 has been successful in disabling the system object that the virus requires.

In step 116, execution of the virus alone can be terminated, but the usual situation will be one where other considerations outweigh the bother of such an "elegant" approach. Instead, the computer 10 can simply be rebooted. Many operating systems today permit rebooting remotely and rebooting computers en-masse over networks. This provides clear benefits when service personnel are far away, or are faced with viral conflagrations on widespread, numerous computer systems. User Manager Pro™ performs all of the operations for cratering remotely, meaning that an administrator need not have physical access to computers to safeguard them or to kill a virus already in them, which is a significant advantage over other virus protection techniques.

In step 118, any suitable manner of confirming the complete execution of step 114 can be used. For instance, the method 100 can simply attempt here to access the system object itself.

If step 118 finds that step 114 did not succeed, sub-process 108 can be repeated. Step 116 and step 118 thus provide for automatic retries until step 114 is successful. In a constant reboot scenario, there is usually a small "window of opportunity" at boot time during which an infected computer is online yet not completely crippled by a virus. This approach permits that opening to be found and used.

In the optional step 110 additional work can be performed. For example, if nothing has been done yet to patch the vulnerability that allowed the computer 10 to become infected with the virus in the first place, this is a suitable time to do that. Also, many viruses change registry entries, to permit the virus to restart, to facilitate the virus being hard to detect, or simply as egotistical "tagging" or for idiosyncratic reasons known only to the virus author. This step is also a good time to "clean up" such vandalism, particularly using an automated software patching and damage clean up utility program. In this manner, the computer 10 can be returned as much as possible to a secure state before the method 100 stops in step 112 and the computer 10 is returned to its normal tasks.

Turning now to the role that registry keys and their values may play in method 100, in step 106 an existing system object that was to be disabled by cratering was "identified". What may be useful before a process like method 100 is performed, however, is to determine if there is a problem and to find out what the system objects are that may be identified in step 106.

Much malware starts up automatically with every reboot of a computer because entries for it have been inserted into the registry. These entries contain details of what system objects the malware needs to run, and where they are stored. One way to therefore help determine which computers in an enterprise have been infected is to create an enterprise-wide report of the "Run" keys on all of the computers and compare the results with known values for common malware. Most anti-virus software vendors publish the keys used by viruses (and many anti-virus software vendors are now starting to do so for other forms of malware, as they expand their product lines to fill the growing need in the marketplace to deal with non-virus malware). Even when a new virus, spybot, adware program, etc., is encountered, registry "fingerprint" information is often available well before a procedure specifically targeted to remove the malware is developed. Thus, scanning for unusual registry changes, e.g., particularly in the HKEY_LOCAL_MACHINE (HKLM) and HKEY_CURRENT_USER (HKCU) hives in computers running the Windows operating system, can discover infections very early on.

The most common registry key used for virus infection is:

HKLM\SOFTWARE\Microsoft\Windows\CurrentVersion\Run

This is used by inserting an arbitrary value and the path to an executable (say, a virus) so that the operating system runs that executable at computer start up. Here are the names and values for two common viruses:

| Virus Name: | "TrayX" = %Windir% |
| W32/Sobig.f@MM | \WINPPR32.EXE /sinc" |
| Virus Name: MSBlaster | "windows auto update" = msblast.exe" |

An alternate strategy is for malware to be launched when a specific user logs in, by locating an executable at:

HKCU\Software\Microsoft\Windows\CurrentVersion\Run

Once something unusual is found, an enterprise-wide edit of computer registries can be performed to remove the entries that are causing the malware program to start up. Cratering, such as the narrowly targeted approach of method 100 (FIG. 2), can then be used to disable the malware program in place. If appropriate, remote reboots en-masse can also be used to disable any malware processes that are already running.

Turning now to another aspect of method 100, an option in step 110 that might seem oddly missing, because it is widely performed in conventional virus "sterilization", is removing the virus files or other virus system objects. This can be done, but as the discussion of step 114 above has implied, the present invention can provide an additional benefit by not doing this.

Cratering involves the creation of an inert system object in the computer system, in the manner described above or in manners discussed below. Once a system object has been cratered it effectively safeguards against re-infection with no additional overhead. This is in marked contrast with traditional virus handling systems, which must continually scan to detect re-infection by malware. In the traditional scheme, the computer system must constantly spend some percentage of its capabilities on self-tests. Cratering, however, requires no additional overhead once performed, since the inert system object "jams the lock". In short, traditional malware handling techniques reduce the capabilities of a computer system; cratering does not.

Figure 3:
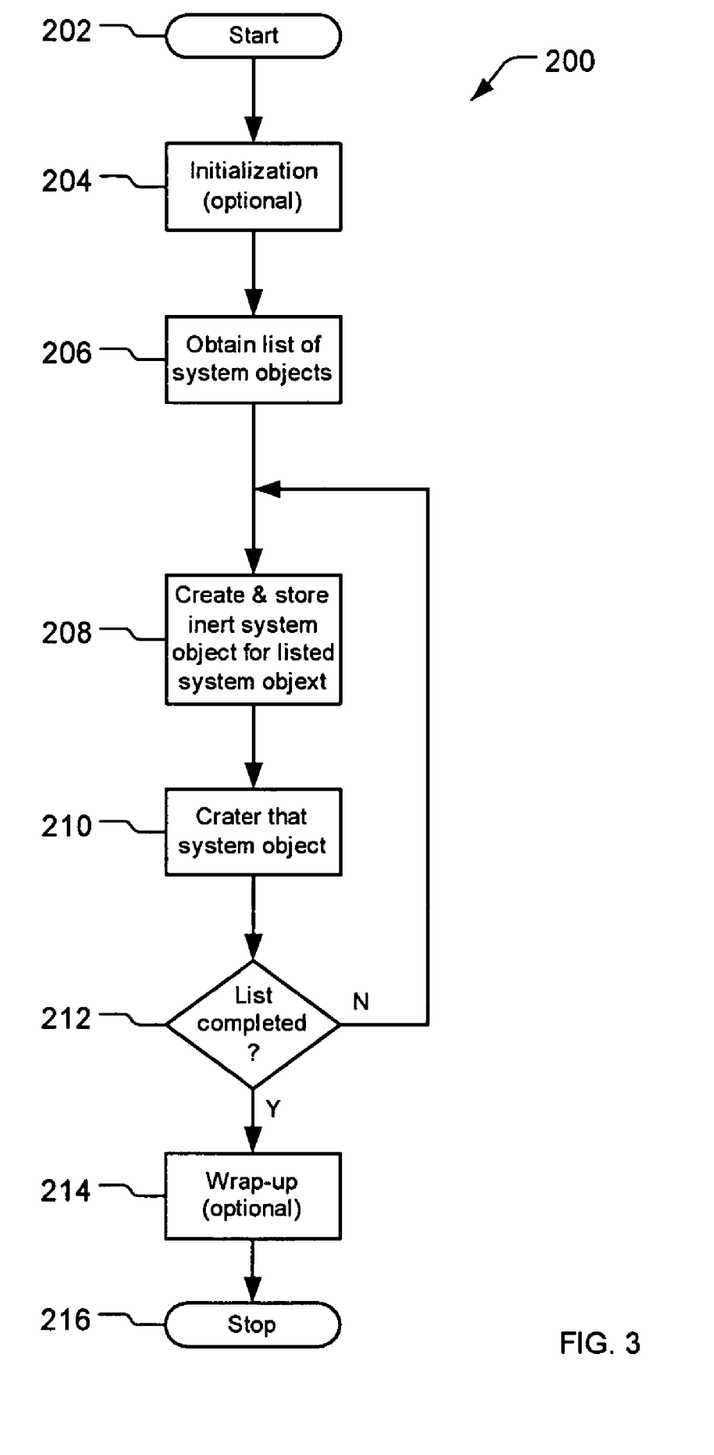
FIG. 3 is a flow chart depicting a method for proactively inoculating against malware in the computer of FIG. 1.

FIG. 3 is a flow chart depicting a method 200 for proactively inoculating against malware in the computer 10 of FIG. 1. The method 200 starts with a step 202, and in an optional step 204 any desired initialization is performed.

In a step 206, a list of system objects and their locations is procured. This list includes the names of system objects that malware requires to execute, as well as where the malware can be expected to look for them in the computer 10. It should particularly be noted that the malware being inoculated against here is not present in the computer 10. This method 200 allows cratering inoculation to be performed without the malware ever having yet come into contact with the computer 10.

In a step 208, a system object of the same name and type as a system object in the list is created and stored in its listed location. For example, a file 20 could be created and stored in the appropriate folder 18. This "dummy" system object can be any size, since it is merely a placeholder, but there may be some considerations guiding the choice of a size for it. By matching the size of the actual malware system objects (say, by having this provided in the list as well), some malware may be convinced that it is already installed and not try further. Also, by keeping file sizes below the minimum cluster size of a storage unit the use of storage is minimized.

In a step 210, the system object just created is cratered. [As a practical matter, step 208 and step 210 can effectively be regarded as one.]

In a step 212, the method 200 determines whether the list procured in step 206 has been completed. If not, the method 200 simply loops back to step 208 and carries on with the next list entry.

Otherwise, in an optional step 214, any additional desired work is performed. And in a step 116 the method 200 stops. Now, any malware programs (virus, spyware, adware, etc.) that have been inoculated against that try to load into the computer 10 cannot do so because an essentially non-deletable, inert system object has taken the place of one or more of the system objects that the malware needs.

Cratering for other purposes, as has been just discussed above, can be used subtly and very powerfully. For example, an enterprise may want even its lower level IT administrators to be prevented from running the remote hash extractor program PWDUMP3E. This program operates by creating a service in each remote machine with an executable named "pwservice.exe". By cratering that file on all of an enterprise's domain controllers, this "hacker tool" is easily disabled. Of course administrators can reverse the effect of such file lockouts by themselves changing ACLs, but that is more than a trivial exercise, given that most administrators will not know the file names that are being used.

Cratering allows "jamming the lock" by placing dummy entries into the computer's operating system. This stops direct copying of unwanted content, as well indirect copying. For instance, one of the most vexing recent forms of malware delivery has been buffer overflow attacks, wherein a buffer in the computer is overloaded and a hostile payload ends up being stored somewhere else in memory and activated. The activated "hostile payload" then, as one of its first orders of business, usually tries to store itself on the disk drive and set things up so that it will automatically be executed, say, after a reboot or a user logging in. The jamming effect of cratering, however, is universal, even when an invading process is running under the auspices of an administrator or operating system level account.

As has been frequently noted above, the present inventor has developed a product, User Manager Pro™, that can be used for cratering. The following is a discussion of how User Manager Pro can be used to crater a series of known virus files on a set of computers. First, the following names and locations of the known variations of W32/Sobig.f@MM, MSBlaster, W32/Nachi.worm and Win32.Dumaru of instances of malware to be inoculated against are stored in a text file:

```
%Windir%\msblast.exe
%Windir%\teekids.exe
%Windir%\penis32.exe
%Windir%\WINPPR32.EXE
%Windir%\WINSTT32.DAT
%Windir%\SYSTEM32\WINS\DLLHOST.EXE
%Windir%\SYSTEM32\WINS\SVCHOST.EXE
%Windir%\SYSTEM32\load32.exe
%Windir%\SYSTEM32\vxdmgr32.exe
%Windir%\dllreg.exe
```

Because these names and paths are stored in a file, they can easily be modified and imported as virus names and paths change over time.

Next, User Manager Pro is started and a group of computers to be inoculated is selected (by highlighting the ones to be cratered). Since User Manager Pro can perform different tasks, cratering is selected with the menu option: "Misc"|"File Operations"|"File Lockout". With reference again to FIG. 3 and process 200, step 202 and step 204 have been completed. For step 206, the text file list is read in (in User Manager Pro it can optionally be edited). Once the text file list is as desired, operating an "OK" button commands User Manager Pro to do the rest. Windows reporting on the status of progress and completion keep the user apprised, but User Manager Pro now essentially performs steps 208-212. Within just a few moments all of the files in the list are created and locked, with the properties of a cratered file as already described. To finish, User Manager Pro can reboot all of the computers to kill any virus processes that were already running. Now, an attempt to infect with or execute the virus produces the results desired by the individuals or the enterprise that owns the computers, i.e., the virus cannot infect or execute in these computers. Life is now good.

User Manager Pro has many features that can be used in the day-to-day mass management of Windows NT, 2000, XP and Server 2003 systems, and only a small subset of its functionality is need to perform virus or other malware removal or inoculation. It can find already infected computers by looking for an entries created by malware. Then, using cratering it can disable the malware by modifying the ACLs (Access Control Lists) of file objects that are critical. This serves to disable existing malware and inhibits re-infection by it. User Manager Pro can then be used to assist in removal of registry keys/values associated with the malware, and to reboot any infected computers.

User Manager Pro also has an ability to push a prepackaged malware removal executable via a "Push/Run" feature. For this, an administrator would find infected computers by looking for entries created by the malware and Push/Run a fix program to all of the systems, say, one provided by one of the many anti-virus product vendors. All of the computers can be rebooted, if necessary, and a post fix report can be generated after the fixes have run.

There are advantages and disadvantages to using this "Push/Run" approach. There is less work for an administrator to do, but the fix program may only remove bad registry entries and not attempt to correct other damage done to the registry by the malware. There is also the potential problem that the Scheduler Service in remote computers may not be running or configured correctly to execute remote jobs (not likely, but possible). The administrator thus may have to still take further action.

On the other hand, the fix program can remove the requirement of a reboot and can potentially take less time. The fix program can also scan all the files and removes infected files from the computers. User Manager Pro and other sophisticated embodiments of the present invention can be quite flexible, allowing administrators to mix techniques so that the fix program is run, to verify the repair has taken place, and to fix the appropriate registry areas with a REGEDIT file push feature.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

What is claimed is:

1. A method for disabling a virus in a computer, the method comprising the steps of:
   (a) identifying a system object in the computer that is required by the virus; and
   (b) storing an access control entry (ACE) in an access control list (ACL) for said system object, wherein said ACE specifies an entity and a permission needed by said entity to access or execute said system object, and said ACE further specifies that said entity is denied said permission, thereby disabling the virus by denying said entity future ability to access or execute said system object.

2. An article of manufacture made by the method of claim 1.

3. The method of claim 1, wherein said system object in the computer is not the virus itself.

4. The method of claim 1, wherein said ACE specifies a said entity including all users and groups of the computer, thereby disabling the virus by denying any said entity future ability to access or execute said system object.

5. The method of claim 1, wherein said ACE specifies a said permission including all access to said system object, thereby disabling the virus by denying said entity any future ability to access or execute said system object.

6. The method of claim 1, wherein the computer employs a registry, and the method further comprising editing said registry to disable automatic execution of said system object.

7. The method of claim 6, further comprising monitoring said registry for edits that will cause execution of said system object, and performing the method if any said edits are detected.

8. The method of claim 1, further comprising:
   (c) rebooting the computer after said step (b), thereby terminating any present execution of the virus.

9. The method of claim 8, wherein said step (c) is initiated by a command remotely communicated to the computer via a network.

10. The method of claim 8, further comprising determining whether said ACE for said system object stored in said step (b) has remained unchanged after said step (c), and repeating the method if not.

11. A method for disabling a process in a computer, the method comprising the steps of:
   (a) identifying a system object in the computer that is required by the process; and
   (b) storing an access control entry (ACE) in an access control list (ACL) for said system object, wherein said ACE specifies an entity and a permission needed by said entity to access or execute said system object, and said ACE further specifies that said entity is denied said permission, thereby disabling the process by denying said entity future ability to access or execute said system object.

12. The method of claim 11, wherein said system object in the computer is the process itself.

13. The method of claim 11, wherein said ACE specifies a said entity including all users and groups of the computer, thereby disabling the process by denying any said entity future ability to access or execute said system object.

14. The method of claim 11, wherein said ACE specifies a said permission including all access to said system object, thereby disabling the process by denying said entity any future ability to access or execute said system object.

15. The method of claim 11, further comprising:
   (c) rebooting the computer after said step (b), thereby terminating any present execution of the process.

16. The method of claim 15, wherein said step (c) is initiated by a command remotely communicated to the computer via a network.

17. The method of claim 15, further comprising determining whether said ACE for said system object of said step (b) has remained unchanged after said step (c), and repeating the method if not.

18. The method of claim 11, wherein said system object is not initially present in the computer, and further comprising:
   creating an instance of said system object; and
   storing said instance of said system object in the computer at one or more storage locations, wherein said step (b) stores a said ACE in a said ACL for each instance of said system object, thereby inoculating the computer against execution of the process by preventing storage of other instances of said system object in said storage locations.

19. The method of claim 18, wherein said ACE specifies a said entity including all users and groups of the computer, thereby disabling the process by denying any said entity future ability to store said system object in said storage locations.

20. The method of claim 11, wherein an authority has deemed the process inappropriate for use by said entity.

21. The method of claim 20, wherein the process is inappropriate because improper use will impair conventional use of the computer.

22. The method of claim 20, wherein the process is inappropriate because use by said entity will violate a policy set for use of the computer.

23. An article of manufacture made by the method of claim 11.

24. A computer program, embodied on a computer readable storage medium, for disabling a virus in a computer, comprising:
   a code segment that identifies a system object in the computer that is required by the virus; and
   a code segment that stores an access control entry (ACE) in an access control list (ACL) for said system object, wherein said ACE specifies an entity and a permission needed by said entity to execute said system object, and said ACE further specifies that said entity is denied said permission, thereby permitting disabling the virus by denying said entity future ability to access or execute said system object.

25. The computer program of claim 24, wherein said code segment that identifies said system object in the computer permits specifying a said system object that is not the virus itself.

26. The computer program of claim 24, wherein said code segment that stores said ACE permits specifying a said entity including all users and groups of the computer, thereby permitting disabling the virus by denying any said entity future ability to access or execute said system object.

27. The computer program of claim 24, wherein said code segment that stores said ACE permits specifying a said permission including all access to said system object, thereby permitting disabling the virus by denying said entity any future ability to access or execute said system object.

28. The computer program of claim 24, wherein the computer employs a registry, and further comprising a code segment that edits said registry to disable automatic execution of said system object.

29. The computer program of claim 28, further comprising a code segment that monitors said registry for edits that will cause execution of said system object, thereby permitting detection of any said edits.

30. The computer program of claim 28, further comprising a code segment that reboots the computer, thereby permitting terminating any present execution of the virus.

31. The computer program of claim 30, wherein said code segment that reboots is initiate-able by a command remotely communicated to the computer via a network.

32. The computer program of claim 30, further comprising a code segment that determines whether said ACE for said system object stored by said code segment for storing has remained unchanged after rebooting.

33. A computer program, embodied on a computer readable storage medium for disabling a process in a computer, comprising:
   a code segment that identifies a system object in the computer that is required by the process; and
   a code segment that stores an access control entry (ACE) in an access control list (ACL) for said system object, wherein said ACE specifies an entity and a permission needed by said entity to access or execute said system object, and said ACE further specifies that said entity is denied said permission, thereby permitting disabling the process by denying said entity future ability to access or execute said system object.

34. The computer program of claim 33, wherein said code segment that identifies said system object in the computer permits specifying a said system object that is not the process itself.

35. The computer program of claim 33, wherein said code segment that stores said ACE permits specifying a said entity including all users and groups of the computer, thereby permitting disabling the process by denying any said entity future ability to access or execute said system object.

36. The computer program of claim 33, wherein said ACE specifies a said permission including all access to said system object, thereby disabling the process by denying said entity any future ability to access or execute said system object.

37. The computer program of claim 33, further comprising a code segment that reboots the computer, thereby permitting terminating any present execution of the process.

38. The computer program of claim 37, wherein said code segment that reboots is initiate-able by a command remotely communicated to the computer via a network.

39. The computer program of claim 37, further comprising a code segment that determines whether said ACE for said system object stored by said code segment for storing has remained unchanged after rebooting.

40. The system of claim 39, wherein said ACE specifies a said entity including all users and groups of the computer, thereby permitting disabling the process by denying any said entity future ability to store said system object in said storage locations.

41. The computer program of claim 33, wherein said code segment that stores said ACE is a first code segment, and further comprising:
   a code segment that creates an instance of said system object; and
   a second code segment that stores said instances of said system object in the computer at one or more storage locations, wherein said first code segment that stores particularly stores a said ACE in a said ACL for each instance of said system object, thereby permitting inoculating the computer against the process when said system object is not present in the computer.

42. The computer program of claim 41, wherein said ACE specifies a said entity including all users and groups of the computer, thereby permitting disabling the process by denying any said entity future ability to store said system object in said storage locations.

43. A system for disabling a process in a computer, comprising:
   means for identifying a system object in the computer that is required by the process; and
   means for storing an access control entry (ACE) in an access control list (ACL) for said system object, wherein said ACE specifies an entity and a permission needed by said entity to access or execute said system object, and said ACE further specifies that said entity is denied said permission, thereby permitting disabling the process by denying said entity future ability to access or execute said system object.

44. The system of claim 43, wherein said system object in the computer is the process itself.

45. The system of claim 43, wherein said ACE specifies a said entity including all users and groups of the computer, thereby permitting disabling the process by denying any said entity future ability to access or execute said system object.

46. The system of claim 43, wherein said ACE specifies a said permission including all access to said system object, thereby permitting disabling the process by denying said entity any future ability to access or execute said system object.

47. The system of claim 43, further comprising means for rebooting the computer after said means for storing has stored said ACE, thereby permitting termination of any present execution of the process.

48. The system of claim 47, wherein said means for rebooting is operable in response to a command remotely communicated to the computer via a network.

49. The system of claim 47, further comprising means for determining whether said ACE for said system object stored by said means for storing has remained unchanged after said means for rebooting has rebooted the computer.

50. The system of claim 43, wherein said means for storing said ACE is a first means for storing and said system object is not initially present in the computer, and further comprising:
   means for creating an instance of said system object; and
   second means for storing said instance of said system object in the computer at one or more storage locations, wherein said first means for storing particularly stores a said ACE in a said ACL for each instance of said system object, thereby permitting inoculating the computer against the process when said system object is not present in the computer.

* * * * *